US011244692B2

(12) United States Patent
Griffin

(10) Patent No.: US 11,244,692 B2
(45) Date of Patent: Feb. 8, 2022

(54) AUDIO WATERMARKING VIA CORRELATION MODIFICATION USING AN AMPLITUDE AND A MAGNITUDE MODIFICATION BASED ON WATERMARK DATA AND TO REDUCE DISTORTION

(71) Applicant: Digital Voice Systems, Inc., Westford, MA (US)

(72) Inventor: Daniel W. Griffin, Hollis, NH (US)

(73) Assignee: Digital Voice Systems, Inc., Westford, MA (US)

( * ) Notice: Subject to any disclaimer, the term of this patent is extended or adjusted under 35 U.S.C. 154(b) by 14 days.

(21) Appl. No.: 16/151,671

(22) Filed: Oct. 4, 2018

(65) Prior Publication Data

US 2020/0111500 A1 Apr. 9, 2020

(51) Int. Cl.

*G10L 19/018* (2013.01)
*G11B 20/00* (2006.01)
*G10L 19/00* (2013.01)
*G10L 19/26* (2013.01)
*G10L 25/21* (2013.01)

(52) U.S. Cl.

CPC ............ *G10L 19/018* (2013.01); *G10L 19/26* (2013.01); *G10L 25/21* (2013.01)

(58) Field of Classification Search

CPC ........ G10L 19/00; G10L 19/018; G10L 19/26
USPC ....................... 704/200.1, 200, E19.009, 500
See application file for complete search history.

(56) References Cited

U.S. PATENT DOCUMENTS 5,388,181 A 2/1995 Anderson et al.
6,633,653 B1 10/2003 Hobson et al.
6,674,876 B1 * 1/2004 Hannigan ............ G06T 1/0028 375/E7.089
7,505,514 B2 3/2009 Ahn
7,957,977 B2 * 6/2011 Zhao ........................ H04N 5/76 375/140
8,768,714 B1 * 7/2014 Blesser ................ G10L 19/018 380/236
9,813,278 B1 11/2017 Meslelh et al.
2003/0036910 A1 * 2/2003 Van Der Veen ............................ G11B 20/00891 704/500

(Continued)

OTHER PUBLICATIONS

Bassia, et al. "Robust audio watermarking in the time domain." IEEE Transactions on multimedia 3.2, Jun. 2001, pp. 232-241. (Year: 2001).*

(Continued)

*Primary Examiner* — Farzad Kazeminezhad
(74) *Attorney, Agent, or Firm* — Fish & Richardson P.C.

(57) ABSTRACT

To convey information using an audio channel, an audio signal is modulated to produce a modulated signal by embedding additional information into the audio signal. Modulating the audio signal processing the audio signal to produce a set of filter responses; creating a delayed version of the filter responses; modifying the delayed version of the filter responses based on the additional information to produce an echo audio signal; and combining the audio signal and the echo audio signal to produce the modulated signal. Modulating the audio signal may involve employing a modulation strength, and a psychoacoustic model may be used to modify the modulation strength based on a comparison of a distortion of the modified audio signal relative to the audio signal and a target distortion.

6 Claims, 8 Drawing Sheets

(56) References Cited

U.S. PATENT DOCUMENTS

| | | | | |
|---|---|---|---|---|
| 2003/0172277 | A1* | 9/2003 | Suzuki | H04H 20/31 713/176 |
| 2004/0148159 | A1* | 7/2004 | Crockett | 704/211 |
| 2005/0025314 | A1* | 2/2005 | Van Der Veen | G10L 19/018 380/254 |
| 2005/0043830 | A1* | 2/2005 | Lee | G10L 19/032 700/94 |
| 2005/0147248 | A1* | 7/2005 | Lemma | H04H 20/31 380/203 |
| 2005/0212930 | A1 | 9/2005 | Sim et al. | |
| 2005/0240768 | A1* | 10/2005 | Lemma | G11B 20/00891 713/176 |
| 2006/0052887 | A1* | 3/2006 | Sakaguchi | G10L 19/018 700/94 |
| 2006/0111913 | A1* | 5/2006 | Oh | G10L 19/018 704/274 |
| 2007/0014428 | A1 | 1/2007 | Kountchev et al. | |
| 2007/0136595 | A1* | 6/2007 | Baum | G10L 19/018 713/176 |
| 2008/0027729 | A1 | 1/2008 | Herre et al. | |
| 2008/0263359 | A1* | 10/2008 | Radzishevsky | H04N 1/32283 713/176 |
| 2013/0218314 | A1 | 8/2013 | Wabnik et al. | |
| 2013/0261778 | A1* | 10/2013 | Zitzmann | G10L 19/018 700/94 |
| 2014/0142958 | A1 | 5/2014 | Sharma et al. | |
| 2014/0278447 | A1* | 9/2014 | Unoki | G10L 19/018 704/500 |
| 2015/0340045 | A1* | 11/2015 | Hardwick | G10L 19/018 704/205 |
| 2016/0293181 | A1* | 10/2016 | Daniel | G10L 21/0364 |

OTHER PUBLICATIONS

Delforouzi, et al. "Increasing payload of echo hiding scheme using dual backward and forward delay kernels." 2007 IEEE International Symposium on Signal Processing and Information Technology. IEEE, Dec. 2007, pp. 375-378. (Year: 2007).*

Hua, Guang, et al. "Time-spread echo-based audio watermarking with optimized imperceptibility and robustness." IEEE/ACM Transactions on Audio, Speech, and Language Processing 23.2, Feb. 2015, pp. 227-239. (Year: 2015).*

Kim, Hyoung Joong, and Yong Hee Choi. "A novel echo-hiding scheme with backward and forward kernels." IEEE transactions on circuits and systems for video technology 13.8, Aug. 2003, pp. 885-889. (Year: 2003).*

Ko, et al. "Time-spread echo method for digital audio watermarking." IEEE Transactions on Multimedia 7.2, Apr. 2005, pp. 212-221. (Year: 2005).*

Li, Li. "Experimental Research on Hiding Capacity of Echo Hiding in Voice." 2010 International Conference on Challenges in Environmental Science and Computer Engineering. vol. 1. IEEE, Mar. 2010, pp. 305-308. (Year: 2010).*

Lie, et al. "Robust and high-quality time-domain audio watermarking based on low-frequency amplitude modification." IEEE transactions on multimedia 8.1, Feb. 2006, pp. 46-59. (Year: 2006).*

Ngo, Nhut Minh, et al. "Method of digital audio watermarking based on cochlear delay in sub-bands." Jan. 2012, pp. 1-5. (Year: 2012).*

Oh, Hyen O., et al. "New echo embedding technique for robust and imperceptible audio watermarking." 2001 IEEE International Conference on Acoustics, Speech, and Signal Processing. Proceedings (Cat. No. 01CH37221). vol. 3. IEEE, May 2001, pp. 1341-1344. (Year: 2001).*

Oh, In-Jung, et al. "Audio Watermarking in Sub-band Signals Using Multiple Echo Kernels." Eighth International Conference on Spoken Language Processing. Oct. 2004, pp. 1-4. (Year: 2004).*

Tekeli, Kadir, et al. "A Comparison of Echo Hiding Methods." The Eurasia Proceedings of Science Technology Engineering and Mathematics 1, Oct. 2017, pp. 397-403. (Year: 2017).*

Wang, Huiqin, et al. "Fuzzyself-adaptive digital audio watermarking based on time-spread echo hiding." Applied Acoustics 69.10, Aug. 2007, pp. 868-874. (Year: 2007).*

Wu, Wen-Chih, and Oscal TC Chen. "Analysis-by-synthesis echo hiding scheme using frequency hopping." 2007 IEEE International Conference on Multimedia and Expo. IEEE, Jul. 2007, pp. 1766-1769. (Year: 2007).*

Arnold et al., "A Phase-Based Audio Watermarking System Robust to Acoustic Path Propagation," IEEE Transactions on Information Forensics and Security, vol. 9, No. 3, Mar. 2014, pp. 411-425.

Chen, et al., "Quantization Index Modulation: A Class of Provably Good Methods for Digital Watermarking and Information Embedding," 2001 IEEE Transactions on Theory, vol. 47, Issue 4, pp. 1423-1443.

Dong et al., "Data Hiding via Phase Manipulation of Audio Signals," 2004 IEEE International Conference on Acoustics, Speech, and Signal Processing, vol. 5, 2004, pp. 377-380.

Gang et al., "MP3 Resistant Oblivious Steganography," 2001 IEEE International Conference on Acoustics, Speech, and Signal Processing, vol. 3, pp. 1365-1368.

PCT International Search Report for International Application No. PCT/US16/13639 filed Jan. 15, 2016 dated Jul. 12, 2016.

* cited by examiner

AUDIO WATERMARKING VIA CORRELATION MODIFICATION USING AN AMPLITUDE AND A MAGNITUDE MODIFICATION BASED ON WATERMARK DATA AND TO REDUCE DISTORTION

TECHNICAL FIELD

This disclosure relates to using watermarking to convey information on an audio channel.

BACKGROUND

"Watermarking" involves the encoding and decoding of information (i.e., data bits) within an analog or digital signal, such as an audio signal containing speech, music, or other auditory stimuli. An audio watermark embedder accepts an audio signal and a stream of information bits as input and modifies the audio signal in a manner that embeds the information into the signal while minimizing the distortion caused by the modification or leaving the original audio content intact. The watermark receiver accepts an audio signal containing embedded information as input (i.e., an encoded signal) and extracts the stream of information bits from the audio signal.

Watermarking has been studied extensively. Many methods exist for encoding (i.e., embedding) digital data into an audio, video, or other type of signal, and generally each encoding method has a corresponding decoding method to detect and extract the digital data from the encoded signal. Most watermarking methods can be used with different types of signals, such as audio, images, and video, for example. However, many watermarking methods target a specific signal type so as to take advantage of certain limits in human perception, and, in effect, hide the data so that a human observer cannot see or hear the data. Regardless of the signal type, the function of the watermark encoder is to embed the information bits into the input signal such that they can be reliably decoded while minimizing the perceptibility of the changes made to the input signal as part of the encoding process. Similarly, the function of the watermark decoder is to reliably extract the information bits from the watermarked signal. In the case of the decoder, performance is based on the accuracy of the extracted data compared with the data embedded by the encoder and is usually measured in terms of bit error rate (BER), packet loss, and synchronization delay. In many practical applications, the watermarked signal may suffer from noise and other forms of distortion before it, reaches the decoder, which may reduce the ability of the decoder to reliably extract the data. For audio signals, the watermarking system must be robust to distortions introduced by compression techniques, such as MP3, AAC, and AC3, which are often encountered in broadcast and storage applications. Some watermark decoders require both the watermarked signal and the original signal in order to extract the embedded data, while others, which may be referred to as blind decoding systems, do not require the original signal to extract the data.

One common method for watermarking is related to the field of spread spectrum communications. In this approach, a pseudo-random or other known sequence is modulated by the encoder with the data, and the result is added to the original signal. The decoder correlates the same modulating sequence with the watermarked signal (i.e., using matched filtering) and extracts the data from the result, with the information bits typically being contained in the sign (i.e., +/−) of the correlation. This approach is conceptually simple and can be applied to almost any signal type. However, it suffers from several limitations, one of which is that the modulating sequence is typically perceived as noise when added to the original signal, which means that the level of the modulating signal must be kept below the perceptible limit if the watermark is to remain undetected. However, if the level (which may be referred to as the marking level) is too low, then the cross correlation between the original signal and the modulating sequence (particularly when combined with other noise and distortion that are added during transmission or storage) can easily overwhelm the ability of the decoder to extract the embedded data. To balance these limitations the marking level is often kept low and the modulating sequence is made very long, resulting in a very low bit rate.

Another known watermarking method adds delayed and modulated versions of the original signal to embed the data. This effectively results in small echoes being added to the signal. The gain of the echoes is held constant over the symbol interval. The decoder calculates the autocorrelation of the signal for the same delay value(s) used by the encoder and extracts the data from the result, with the information bits being contained in the sign (i.e., +/−) or quantization levels of the autocorrelation. For audio signals, small echoes can be difficult to perceive and hence this technique can embed data without significantly altering the perceptual content of the original signal. However, by using echoes, the embedded data is contained in the fine structure of short time spectral magnitude and this structure can be altered significantly when the audio is passed through low bit rate compression systems such as AAC at 32 kbps. In order to overcome this limitation, larger echoes must be used, which may cause perceptible distortion of the audio.

Other watermarking systems have attempted to embed information bits by directly modifying the signal spectra. In one technique, which is described in U.S. Pat. No. 6,621,881, an audio signal is segmented and transformed into the frequency domain and, for each segment, one or two reference frequencies are selected within a preferred frequency band of 4.8 to 6.0 kHz. The spectral amplitude at each reference frequency is modified to make the amplitude a local minima or maxima depending on the data to be embedded. In a related variation, which is also described in U.S. Pat. No. 6,621,881, the relative phase angle between the two reference frequencies is modified such that the two frequency components are either in-phase (0 degrees phase difference) or out-of-phase (180 degrees phase difference) depending on the data. In either case, only a small number of frequency components are used to embed the data, which limits the amount of information that can be conveyed without causing audible degradation to the signal.

Another phase-based watermarking system, which is described in "A Phase-Based Audio Watermarking System Robust to Acoustic Path Propagation" by Arnold et. al., modifies the phase over a broad range of frequencies (0.5-11 kHz) based on a set of reference phases computed from a pseudo-random sequence that depends on the data to be embedded. As large modifications to the phase can create significant audio degradation, limits are employed that reduce the degradation but also significantly lower the amount of data that can be embedded to around 3 bps.

Many watermarking systems can be improved, in a rate-distortion sense, by using the techniques described in "Quantization Index Modulation: A Class of Provably Good Methods for Digital Watermarking and Information Embedding" by Chen and Wornell. In this approach, a multi-level constellation of allowed quantization values are assigned to represent the signal parameter (e.g., time sample, spectral magnitude, and phase) into which the data is to be embedded. These quantization values are then subdivided into two or more subsets, each of which represents a particular value of the data. In the case of binary data, two subsets are used. For each data bit, the encoder selects the best quantization value (i.e., the value closest to the original value of the parameter) from the appropriate subset and modifies the original value of the parameter to be equal to the selected value. The decoder extracts the data by measuring the same parameter in the received signal and determining which subset contains the quantization value that is closest to the measured value. One advantage of this approach is that rate and distortion can be traded off by changing the size of the constellation (i.e., the number of allowed quantization values). However, this approach must be applied to an appropriate signal parameter that can carry a high rate of information while remaining imperceptible. In one method, which is described in "MP3 Resistant Oblivious Steganography" by Gang et. al., Quantization Index Modulation (QIM) is used to encode data within the spectral phase parameters.

SUMMARY

An audio watermarking system allows information to be conveyed to a receiving device over an audio channel. The watermarking system includes a modulator/encoder that modifies the audio signal in order to embed information and a demodulator/decoder that detects the audio signal modifications to extract the information. Since this generally is not an error free process, a channel encoder and decoder are included to add redundant error correction data (FEC) to reduce the information error rate to acceptable levels.

The encoder operates by using a filter bank to divide the input signal into frequency bands. The filter bank outputs are delayed and multiplied by amplitudes derived from a combination of the watermark data information bits to be transmitted and a modulation strength. These amplitude-modulated, delayed filter bank outputs are multiplied by a tapered window and added to the original signal to produce a modified signal containing echoes of the original signal. The modulation strength may be controlled by using a psychoacoustic model to compare the modified signal with the original signal so that a target distortion is not exceeded.

The encoder also may add error detection and correction bits to payload data. For example, Cyclic Redundancy Check (CRC) bits may be added to increase error detection and a convolutional code may be used to add error correction capability. Interleaving may be used to improve performance for burst errors. A secondary encoder controlled by a low autocorrelation sidelobe sequence may add redundancy which may be exploited for synchronization in addition to improved error detection and correction capability.

An audio watermark receiver operates by using a demodulator to compute soft bits and weights from a received audio signal. A synchronizer may be used to determine likely packet start times from the soft bits and weights. A decoder attempts to recover the payload data from the soft bits and weights for a particular start time. The decoder may produce a packet metric for each decoded payload as a measure of confidence that the payload was correctly decoded.

In one general aspect, conveying information using an audio channel includes modulating an audio signal to produce a modulated signal by embedding additional information into the audio signal. Modulating the audio signal includes processing the audio signal to produce a set of filter responses; creating a delayed version of the filter responses; modifying the delayed version of the filter responses based on the additional information to produce an echo audio signal; and combining the audio signal and the echo audio signal to produce the modulated signal.

Implementations may include one or more of the following features. For example, modifying the delayed version of the filter responses may include segmenting the delayed filter responses using a window function, which may be nonrectangular, to produce windowed delayed filter responses and modifying the windowed delayed filter responses based on the additional information to produce an echo audio signal.

The additional information may be formed by modifying encoded information by generating a low autocorrelation sidelobe sequence; selecting a set of codewords based on the value of the low autocorrelation sidelobe sequence; and further encoding the encoded information using the selected set of codewords to produce the additional information.

A magnitude of the echo audio signal may be modified to control a level of distortion in the modulated signal relative to the audio signal. Modifying the magnitude of the echo audio signal may include employing a psychoacoustic model to estimate a perceived distortion in the modulated signal for a particular magnitude of the echo audio signal and reducing the magnitude until a desired target distortion is obtained. Modifying the magnitude of the echo audio signal also may include applying a weighting function, where a weighting function applied for a first time segment differs from a weighting function applied for a second time segment.

The additional information may include payload data, and may further include watermark data produced by adding error detection and correction bits to the payload data.

In another general aspect, an audio encoder conveys information using an audio channel by modulating an audio signal to produce a modulated signal by embedding additional information into the audio signal. The audio encoder includes a modulator configured to receive audio data and additional information and to modulate the audio data using the additional information and a modulation strength to produce modified audio data. The audio encoder also includes a psychoacoustic model configured to receive the audio data, the modified audio data, and a target distortion, and to modify the modulation strength based on a comparison of a distortion of the modified audio data relative to the audio data and the target distortion. The modulator divides the audio data into time segments and modulation strength for a first time segment differs from a modulation strength for a second time segment.

Implementations may include one or more of the following features and one or more of the features discussed above. For example, the modulator may include a filter bank that receives the audio signal and produces filter outputs; a delay module that receives the filter outputs and produces a delayed version of the filter outputs; an echo amplitude generator that receives the additional information and the modulation strength and produces echo amplitudes corresponding to the additional information and the modulation strength; a multiplier that combines the delayed version of the filter outputs and the echo amplitudes to produce echoes; and a combiner that combines the audio signal and the echoes to produce the modified audio signal. The filter bank may include a set of bandpass finite impulse response ("FIR") filters.

In another general aspect, an audio receiver receives an audio signal including embedded additional information and extracts the additional information. The audio receiver includes a demodulator configured to receive an audio signal and to extract data bits and weights; a synchronizer configured to receive the data bits and the weights and to generate packet start indicators; and a decoder configured to receive the data bits, the weights, the packet start indicators, and a detection threshold, and to generate detected data payloads and packet metrics. The demodulator includes a complex filter bank that processes the audio signal to produce filter outputs. The filter bank includes a set of complex bandpass finite impulse response filters.

Implementations may include one or more of the following features and one or more of the features discussed above. For example, the demodulator may include a weighted correlation and energy module that produces correlation and energy outputs, a mapper that uses the correlation and energy outputs to produce the data bits, and a weight generator that uses the correlation and energy outputs to produce the weights.

In another general aspect, decoding information conveyed using an audio channel includes receiving an audio signal, processing the received audio signal to produce a set of filter responses, creating a delayed version of the filter responses, forming filter response correlations from the filter responses and delayed filter responses, and modifying the filter response correlations to recover the conveyed information.

Implementations may include one or more of the following features and one or more of the features discussed above. For example, the filter responses may be complex, and modifying the filter response correlations may include segmenting the filter response correlations using a window function to produce windowed filter response correlations and modifying the windowed filter response correlations to recover the conveyed information. The window function may be nonrectangular.

In another general aspect, synchronizing information conveyed using an audio channel includes receiving an audio signal; processing the received audio signal to produce filter response correlations; modifying the filter response correlations to produce soft bits; generating a low autocorrelation sidelobe sequence; selecting a set of codewords based on the value of the low autocorrelation sidelobe sequence; and synchronizing based on the distance between the selected set of codewords and the soft bits.

The details of particular implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
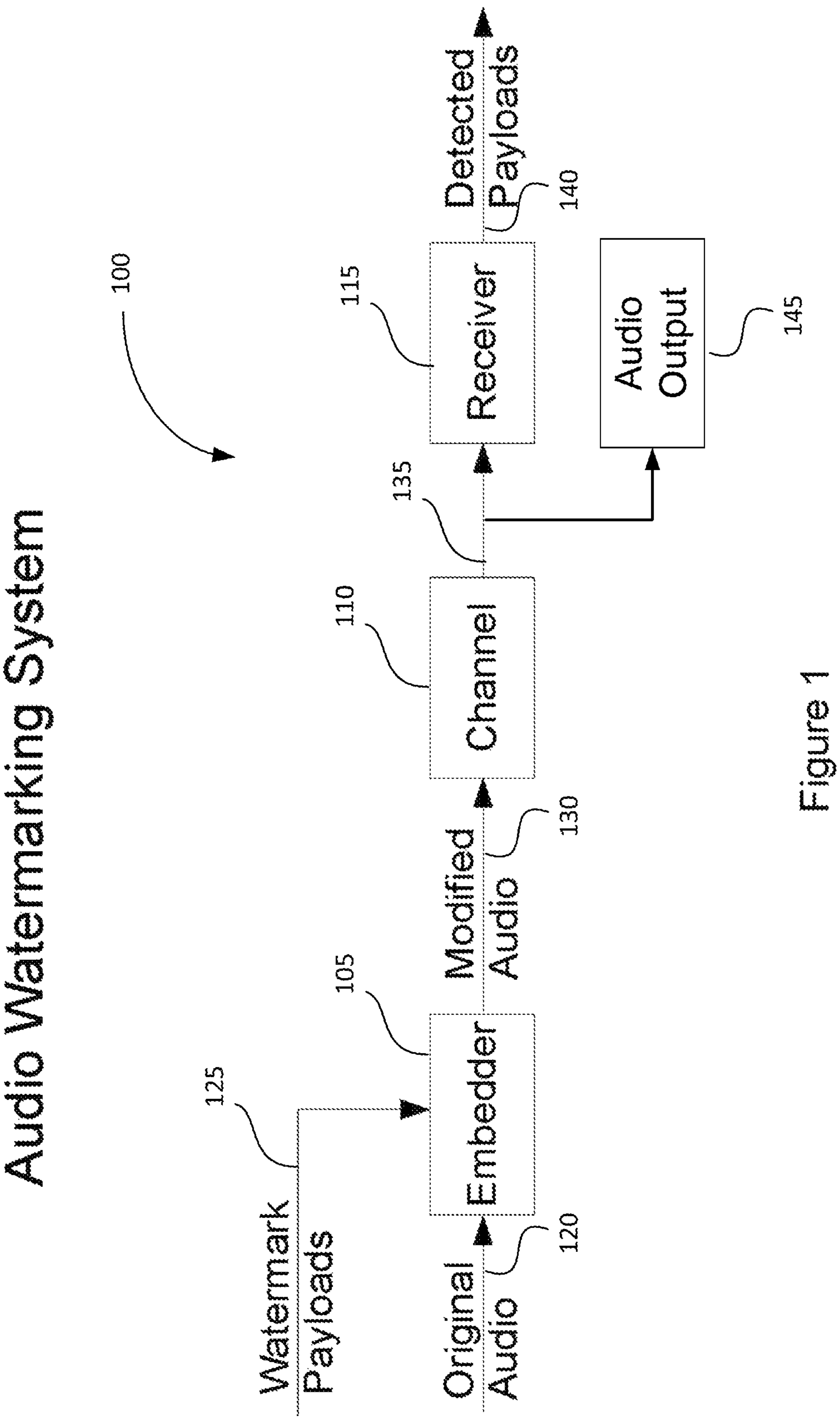
FIG. 1 is a block diagram of an audio watermarking system.

Referring to FIG. 1, an audio watermarking system 100 includes an audio watermark embedder 105, a channel 110, and an audio watermark receiver 115.

The embedder 105 receives an original audio signal 120 and watermark payload information 125 and embeds the information 125 in the original audio signal to produce a modified audio signal 130. Both the original audio signal 120 and the modified audio signal 130 may be analog audio signals that are compatible with low fidelity transmission systems.

The channel 110 transmits the modified audio signal 130 as a transmitted signal 135 that is received by the receiver 115.

The receiver processes the received signal 135 to extract a detected payload 140 that corresponds to the watermark payload 125. An audio output device 145, such as a speaker, also receives the transmitted signal 135 and produces sounds corresponding to the audio signal 120.

The audio watermarking system 100 may be employed in a wide variety of implementations. For example, the audio watermark embedder 105 may be included in a radio handset, with the information 125 being, for example, the location of the handset, the conditions (e.g., temperature) at that location, operating conditions (e.g., battery charge remaining) of the handset, identifying information (e.g., a name or a badge number) for the person using the handset, or speaker verification data that confirms the identity of the person speaking into the handset to produce the audio signal 120. In this implementation, the audio watermark receiver 115 would be included in another handset and/or a base station.

In another implementation, the audio watermark embedder 105 is employed by a television or radio broadcaster to embed information 125, such as internet links, into a radio signal or the audio portion of a television signal, and the audio watermark receiver 115 is employed by a radio or television that receives the signal, or by a device, such as a smart phone, that employs a microphone to receive the audio produced by the radio or television.

Figure 2:
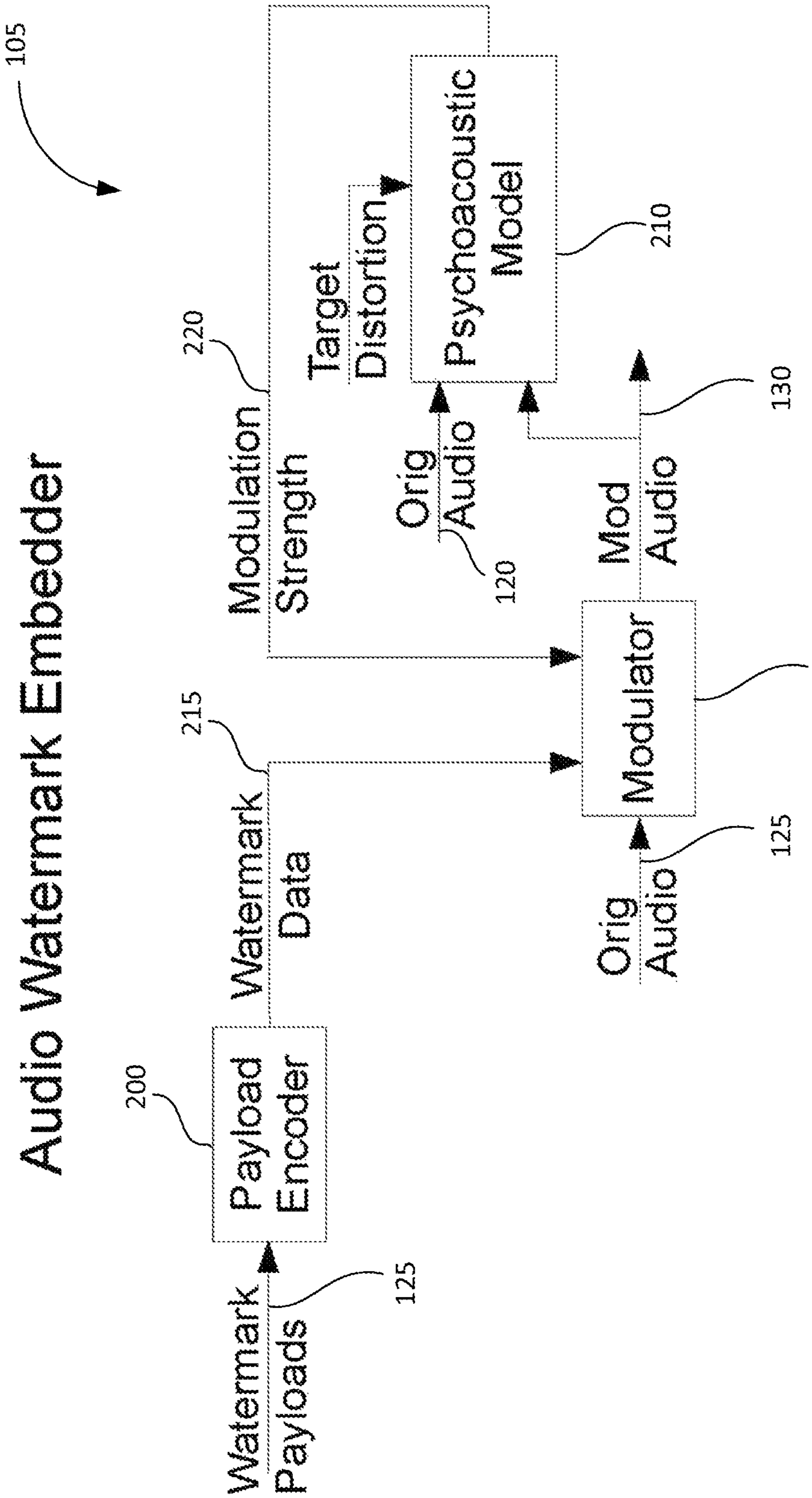
FIG. 2 is a block diagram of an audio watermark embedder.

Referring to FIG. 2, in one implementation, the audio watermark embedder 105 includes a payload encoder 200, a modulator 205, and a psychoacoustic model 210.

The encoder 200 adds error detection and correction bits to payload data 125 to produce watermark data bits 215. During transmission, the modified audio signal 130 may be subject to various forms of distortion including, for example, additive noise, low bit rate compression, filtering, and room reverberation, and these can all impact the ability of the demodulator and decoder to reliably extract the payload data from the watermarked audio signal. To improve performance and synchronization, the encoder 200 may use a combination of features including bit repetition, error correction coding, and error detection.

The modulator 205 modifies the original audio signal 120 using a modulation strength 220 to encode the watermark data bits 215 in the audio to produce the modified audio signal 130.

The psychoacoustic model 210 compares the modified audio signal 130 to the original audio 120 to determine distortion in the modified audio signal 130 and controls the modulation strength 220 based on a comparison of the determined distortion to a target distortion threshold. For example, if the model 210 determines that the distortion is approaching or exceeding the target distortion threshold, the model 210 may reduce the modulation strength 220.

Figure 3:
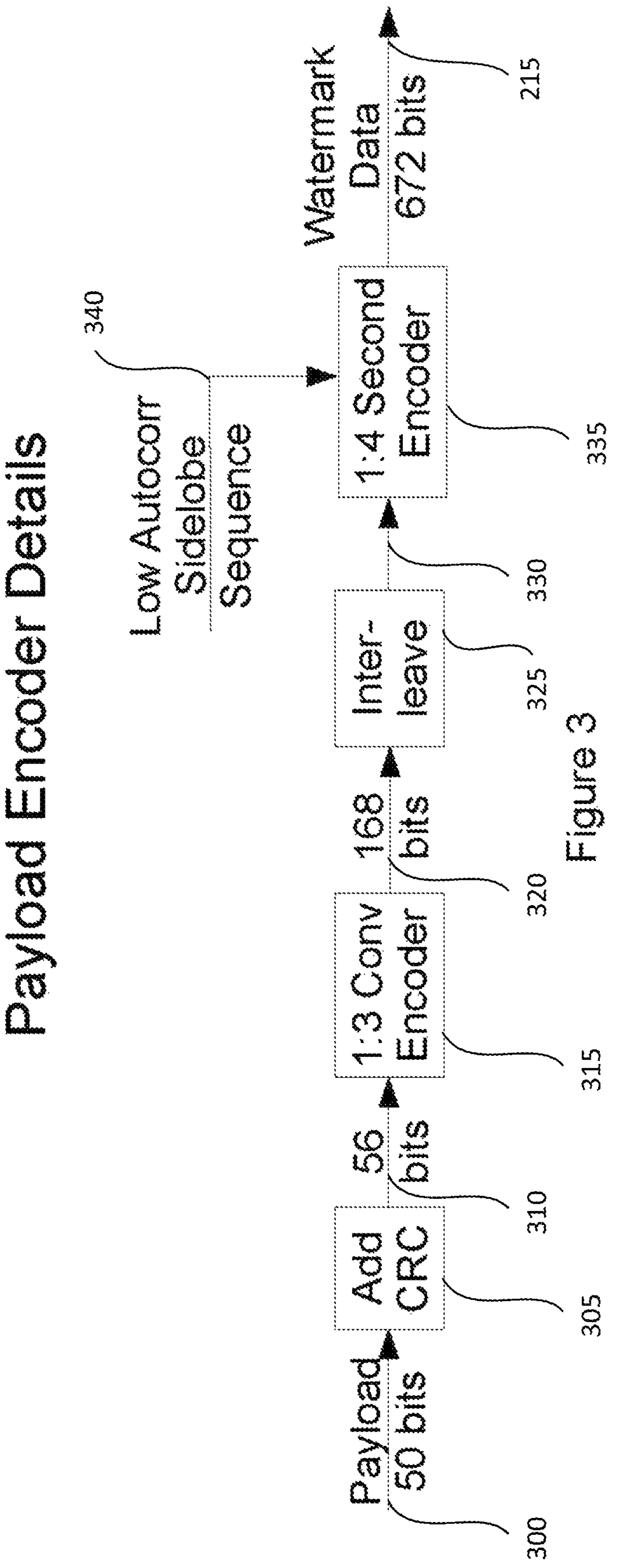
FIG. 3 is a block diagram of an encoder.

Referring also to FIG. 3, one implementation of the encoder 200 receives a stream of information source bits and applies error correction coding and error detection coding to create a higher rate stream of channel bits. The stream of source bits 125 are divided into 50 bit packets 300. A CRC coder 305 protects each packet with a 6 bit Cyclic Redundancy Check (CRC) to produce a 56 bit packet 310 that is encoded with a ⅓ rate circular convolution encoder 315 to produce a 168 bit packet of channel data. While other error detection and correction codes may be used, one implementation uses a generator polynomial $G(X)=1+X+X^6$ to provide the CRC error detection and the ⅓ rate convolutional code is formed with generator polynomials:

$$G_1(X)=1+X^2+X^3+X^5+X^6+X^7+X^8$$

$$G_2(X)=1+X+X^3+X^4+X^7+X^8$$

$$G_3(X)=1+X+X^2+X^5+X^8$$

An interleaver 325 then interleaves the 168 bits of channel data to produce interleaved channel data 330 so that burst errors due to transmission from modulator to demodulator are spread out more evenly through the packet, which allows better performance of the convolutional code. The interleaved channel data 330 then may be grouped into symbols. For example, the 168 bits of interleaved channel data may be grouped into 21 symbols with 8 bits per symbol.

The interleaved channel data 330 may pass through a secondary encoder 335 to match the bits per symbol to the number of frequency bands available. For example, in a system employing 32 frequency bands, each of the 8 bits per symbol may be encoded with a 4 bit codeword to produce 1 bit for each of the 32 frequency bands, with the resulting watermark data 215 including 672 bits for each packet.

The secondary encoder codewords may be selected to aid synchronization. For example, a low autocorrelation sidelobe sequence 340, such as a m-sequence may be used to improve packet synchronization. This sequence may be generated with length equal to the number of symbols per packet. Then, for each symbol, the sequence value may be used to select a set of secondary encoder codewords. An exemplary system with 21 symbols per packet uses the low autocorrelation sidelobe sequence [110000011101110101101]. When a 0 is encountered in this sequence, each of the 8 bits for that symbol are encoded using the codewords [0011] to transmit a 0 or [1100] to transmit a 1. When a 1 is encountered in this sequence, each of the 8 bits for that symbol are encoded using the codewords [0110] to transmit a 0 or [1001] to transmit a 1.

One implementation spreads the output bits from the secondary encoder in frequency by assigning the first codeword output to frequency bands [0, 8, 16, 24], the second codeword output to frequency bands [1, 9, 17, 25], and so on until the last codeword output for a particular symbol is spread to frequency bands [7, 15, 23, 31].

In an exemplary system, which may be applicable to broadcast television, the 50 bit packet may include the following information:

1) a Payload Length field (1 bit) which identifies when multiple packets contain the payload; and
2) a Payload Data field (49 bits).

When the Payload Length field has a value of 0, the Payload Data field may contain the following data:

1) a Payload Type field (3 bits) which identifies the contents of the Remaining Data field; and
2) a Remaining Data field (46 bits).

When the payload type field has a value of [000], the Remaining Data field may contain a 32 bit advertisement identifier such as Ad-ID and 14 bits of Fill Data. The Fill Data may contain a 14 bit CRC computed using the other bits in the packet to increase error detection capabilities. Other values of the payload type field may be reserved for future expansion.

When the Payload Length field has a value of 1, this may be used to indicate that two packets are required to contain the entire payload. For this case the Payload Data field of the first packet may contain the following data:

1) a Payload Type 1 field (1 bit) which identifies the contents of the Remaining Data field; and
2) a Remaining Data 1 field (48 bits).

When the payload type 1 field has a value of 0, the Remaining Data 1 field may contain the first 48 bits of a 96 bit audio visual object identifier such as EIDR.

The second packet may be distinguished from the first packet through the use of a different CRC field. For example, the first packet may use a standard 6 bit CRC and the second packet may use the standard 6 bit CRC that is exclusive ored with the value 63.

The Payload Data field of the second packet may contain the following data:

1) a Payload Type 2 field (2 bit) which identifies the contents of the Remaining Data 2 field; and
2) a Remaining Data 2 field (48 bits).

When the payload type 2 field has a value of [00], the Remaining Data 2 field may contain the remaining 48 bits of a 96 bit audio visual object identifier such as EIDR.

Figure 4:
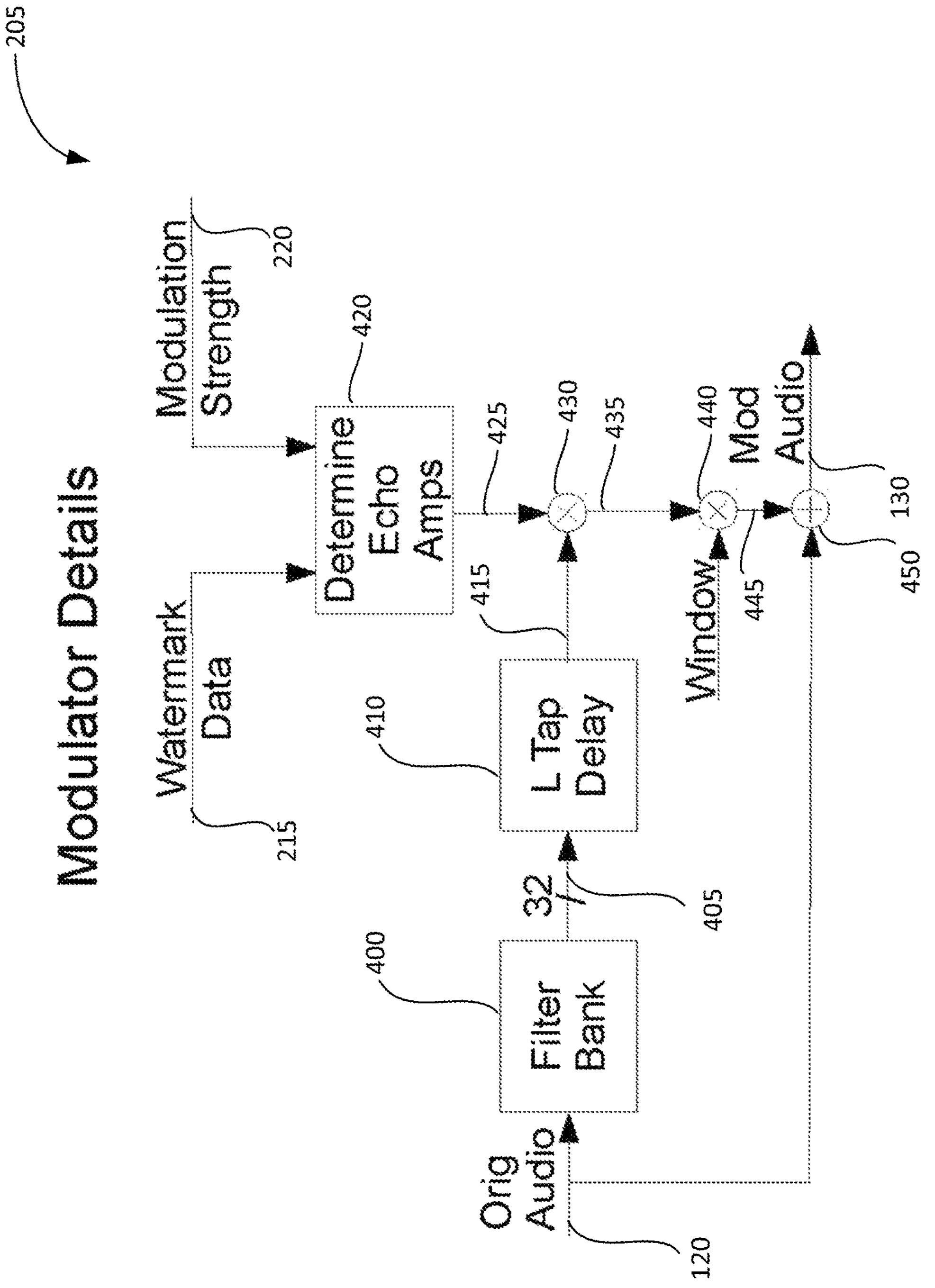
FIG. 4 is a block diagram of a data modulator.

Referring to FIG. 4, the watermark modulator 205 includes a filter bank 400 that receives the original audio signal 120 and produces filter outputs 405 that are provided to an L tap delay module 410 that produces delayed versions 415 of the filter outputs 405 that are uses to produce echoes of the original audio signal 120. An echo amplitude generator 420 receives the watermark data 215 and the modulation strength 220 and uses them to produce echo amplitudes 425 that a multiplier 430 uses to set the amplitudes of the delayed filter outputs 415 to produce echoes 435. A window 440 produced windowed versions 445 of the echoes 435 that a combiner 450 combines with the original audio signal 120 to produce the modified audio signal 130.

In more detail, the watermark modulator 205 receives the original audio signal 120 as a series of signal samples s[n, c], where n is a time index and c is a channel index. A sampled signal s[n, c] may be monaural (one channel), stereo (two channels), or 5.1 surround (6 channels), for example. One implementation employs a sampling rate of 48 KHz.

The filter bank 400 receives the sampled signals. The filter bank 400 includes a set of bandpass finite impulse response ("FIR") filters $h_k[n]$ generated using a windowing method where k is the band index. In one implementation, a Hanning window function with an exemplary length of 449 samples is used to generate filters, with a lowest pass band edge frequency of 427.62 Hz and subsequent band edges spaced by 534.52 Hz. This implementation employs 32 bands. The filter bank produces 32 filter outputs 405, with each filter output $x_k[n, c]$ being produced by filtering the sampled signal with the kth bandpass FIR filter for each channel index:

$$x_k[n,c]=\Sigma_m h_k[m]s[n-m,c].$$

A modified sampled signal ŝ[n, c] is produced by adding (using the combiner 450) echoes of the filter outputs to the sampled signal s[n, c] with a gain $g_k[n, c]$ (as produced by the echo amplitude generator 420) and lag l (as introduced by the L tap delay module 410) with an exemplary value of 192:

$$\hat{s}[n,c]=s[n,c]+\Sigma_k g_k[n,c]x_k[n-l,c].$$

An exemplary value of the gain function produced by the echo amplitude generator 420 is the product of an amplitude term $a_k[i, c]$, corresponding to the watermark data 215 and modulation strength 220, and a weighting function $w_k[n]$:

$$g_k[n,c]=a_k[i,c]w_k[n-n_i]$$

where i is the modulation time index and the weighting function is applied using a L sample Hanning window where L has an exemplary value of 1920. A tapered weighting function tends to reduce the perceptibility of the modification in comparison to a rectangular weighting. The weighting function $w_k[n]$ is set to zero outside of these L samples.

The weighting function for one frequency band may be time shifted relative to another frequency band to more evenly distribute the signal modification in time and reduce perceptibility. For example, even band indices may have a nonzero weighting function for the interval [0, L−1] and odd band indices may have a nonzero weighting function for the interval [L/4, L/4+L−1], The modulation time start samples $n_i$ have exemplary values of iL.

Binary watermark data values $b_k[j, c]$ (from the watermark 215) may be encoded by setting $a_k[2j, c]=a_{init}(2b_k[j, c]-1)$ and $-a_k[2j+1, c]=a_{init}(2b_k[j, c]-1)$ where $a_{init}$ is an initial amplitude with exemplary value 0.9. Adjacent modulation times encode the binary data which may be recovered using a weighted correlation as discussed below with respect to the demodulator.

A simple example of how adding echoes of a signal to itself changes the correlation is useful for understanding the operation of the modulator and demodulator. Suppose the sampled signal s[n] is monaural white noise with variance $\sigma^2$ and the modified sampled signal $\hat{s}[n]$ is determined as:

$$\hat{s}[n]=s[n]+as[n-l]$$

where a is the echo amplitude and l≠0 is the echo delay. For this simple case, the expected value of the autocorrelation of $\hat{s}[n]$ at lag l is $\hat{r}_l=E\{\hat{s}[n]\hat{s}[n-l]\}=a\sigma a^2$ and the expected value of the energy is $\hat{r}_0=E\{\hat{s}[n]^2\}=(1+a^2)\sigma^2$. A normalized expected autocorrelation may be defined $\hat{\rho}_l=\hat{r}_l/\hat{r}_0=a/(1+a^2)$. An echo amplitude in the range [−1,1] may be used to modify the normalized expected autocorrelation to the range [−0.5,0.5]. This demonstrates how the echo amplitude may be used to modify the normalized expected autocorrelation.

Generally, audio signals tend to have nonzero correlation, so it is important to understand the system behavior for this case. For example, suppose the sampled signal s[n] is of the sum of a monaural white noise signal u[n] and an echo of u[n] so that $s[n]=u[n]+\alpha u[n-l]$ where $\alpha$ is the echo amplitude and l≠0 is the echo delay. A normalized expected autocorrelation for the signal s[n] may be defined $\rho_l=r_l/r_0=\alpha/(1+\alpha^2)$. For this example, the normalized expected autocorrelation is nonzero as long as the echo amplitude $\alpha$ is nonzero. The modified sampled signal $\hat{s}[n]$ is computed in the same manner $\hat{s}[n]=s[n]+as[n-l]$. For this case, the expected value of the autocorrelation of $\hat{s}[n]$ at lag l is $\hat{r}_l=E\{\hat{s}[n]\hat{s}[n-l]\}=(\alpha(1+a^2)+a(1+\alpha^2))\sigma^2$ and the expected value of the energy is $\hat{r}_0=E\{\hat{s}[n]^2\}=(1+\alpha^2)(1+a^2)\sigma^2+2a\alpha\sigma^2$. A normalized expected autocorrelation may be defined as $$\hat{\rho}_l=\hat{r}_l/\hat{r}_0=(b+\beta)/(1+2b\beta)$$

where $b=a/(1+a^2)$ and $\beta=\alpha/(1+\alpha^2)$. This case illustrates the difficulty in achieving a desired correlation in the modified signal $\hat{s}[n]$ when the signal s[n] is correlated. For example, if $\alpha=1$, so that $\rho_l=0.5$, then an echo amplitude a in the range [−1,1] will only produce a range of [0, 2/3] in the normalized expected autocorrelation $\hat{\rho}_l$. This example demonstrates that, for a correlated signal, it may not be possible to control the sign of the normalized autocorrelation of the modified signal.

For signals with slowly changing correlation in time, it may be beneficial to encode watermark data values using the difference in correlation between two different time intervals. So, for example, a zero may be modulated as a positive correlation difference and a one may be modulated as a negative correlation difference. Using the previous example, the signal may be modified so that a first time interval has normalized autocorrelation of 0 and a second time interval has normalized autocorrelation of ⅔ to represent a zero, with the reverse being used to represent a one. In this manner, two symbols may be modulated to encode a differential symbol.

One application of a watermarking system involves playing the watermarked audio through one or more speakers and receiving the audio with one or more microphones. This application tends to be difficult due to multiple propagation paths from speaker to microphone due to reflection from objects as well as the addition of noise from multiple sources. The difference in propagation time between the multiple paths may result in imersymbol interference. The intersymbol interference can be reduced by increasing the symbol length. To preserve the data rate, the number of frequency bands may be increased to compensate for the reduced symbol rate.

Referring again to FIG. 2, the psychoacoustic model 210 may be used to estimate the perceived distortion introduced by a particular amplitude term $a_k[i, c]$. The amplitude term may be reduced to achieve a desired target distortion for the time interval, frequency band, and channel affected by this amplitude term. The psychoacoustic model may be a well-known model such as one described in the MPEG-1 Audio Standard.

Figure 5:
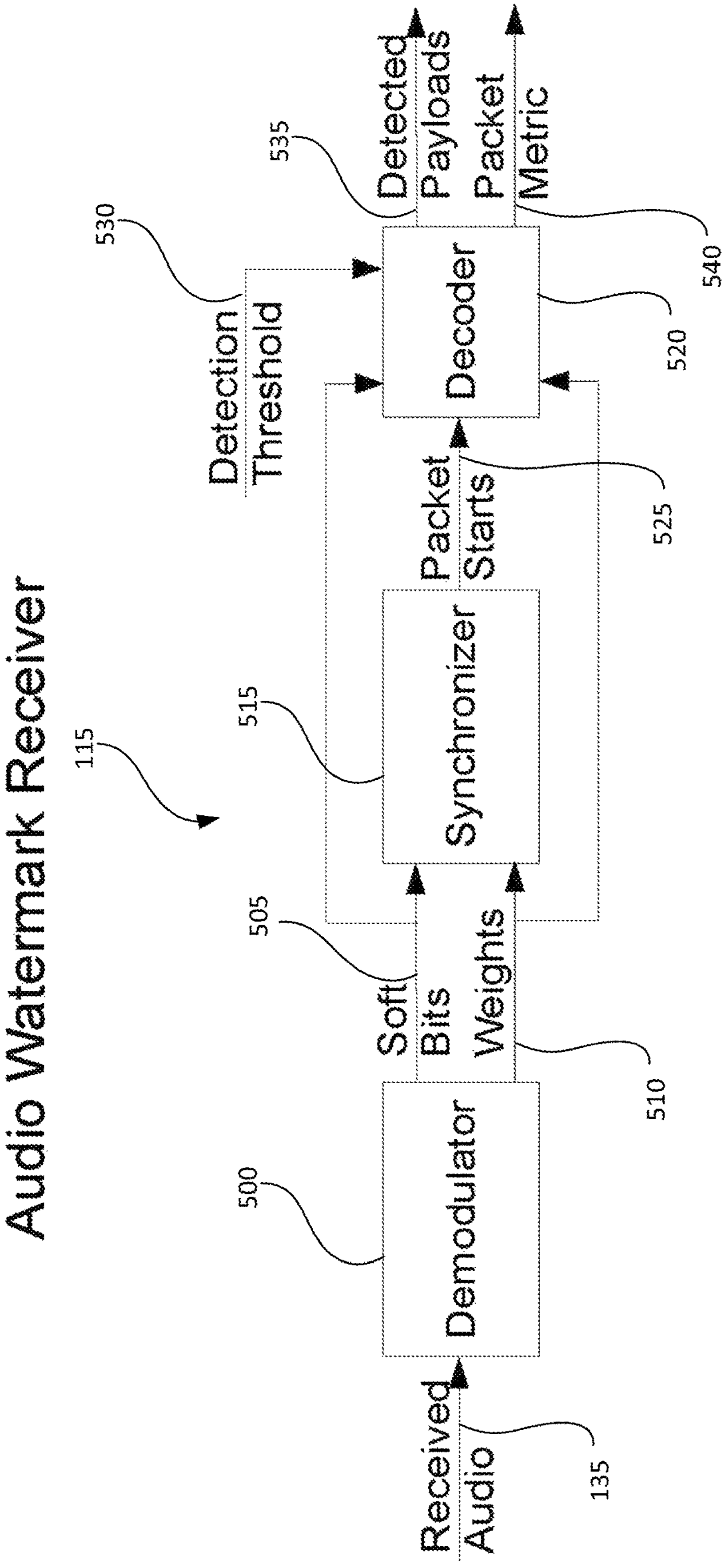
FIG. 5 is a block diagram of an audio watermark receiver.

Referring to FIG. 5, the audio watermark receiver 115 includes a demodulator 500 that receives the transmitted audio signal 135. The demodulator 500 processes the received audio signal 135 to produce soft bits 505 and weights 510 that are provided to a synchronizer 515 and a decoder 520. The synchronizer 515 uses the soft bits 505 and weights 510 to produce packet starts 525 that are provided to the decoder 520. The decoder 520 processes the soft bits 505 and the weights 510 using the packet starts 525 and a detection threshold 530 to identify detected payloads 535 and packet metrics 540.

Figure 6:
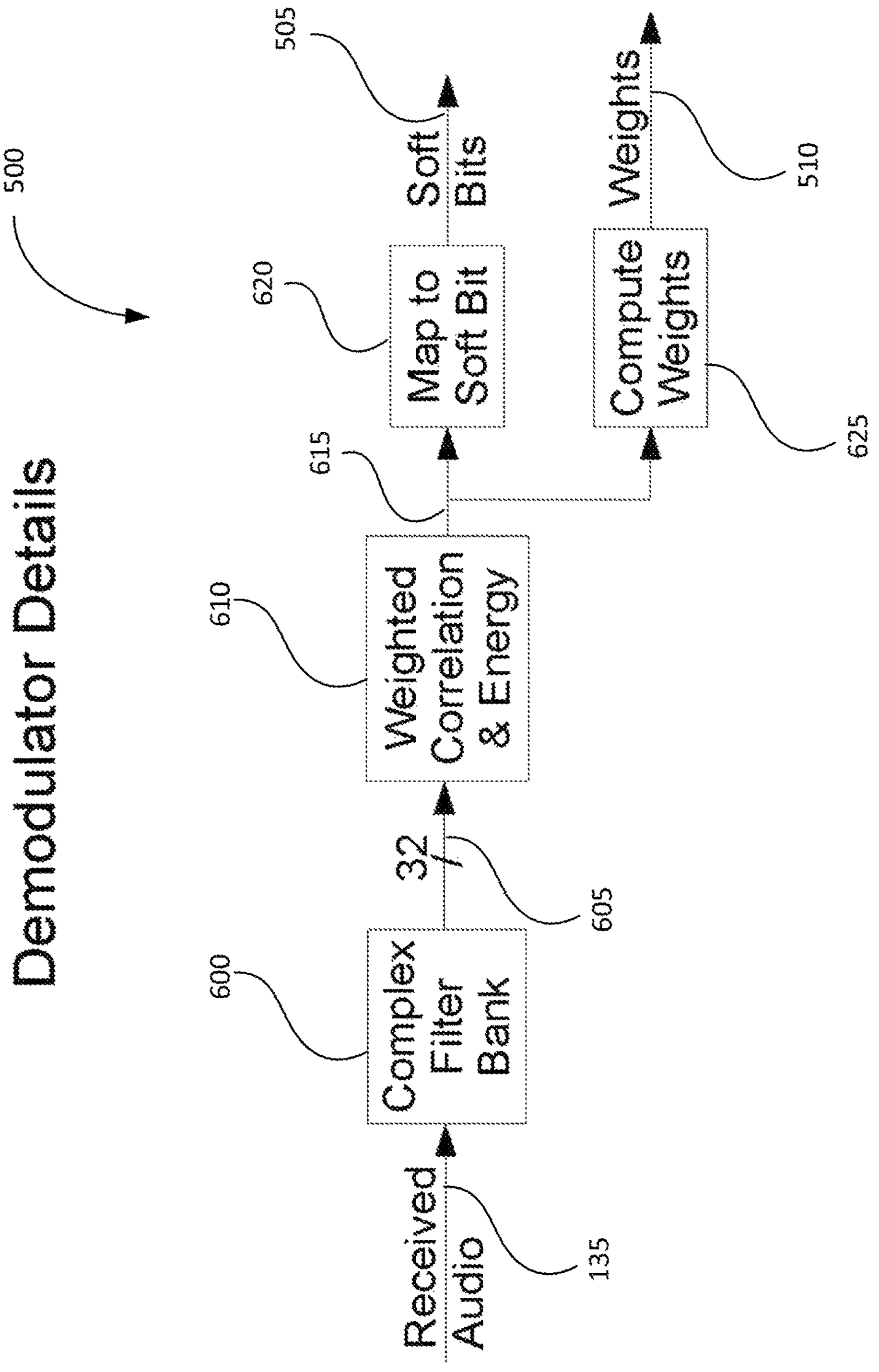
FIG. 6 is a block diagram of a demodulator.

Referring to FIG. 6, the demodulator 500 includes a filter bank 600 that receives the transmitted audio signal 135 and produces filter outputs 605 that are provided to a weighted correlation and energy module 610 that produces correlation and energy outputs 615 that a mapper 620 maps to the soft bits 505 and a weight generator 625 uses to determine the weights 510.

The demodulator 500 receives the transmitted audio signal 135 as a series of signal samples s[n, c], where n is a time index and c is a channel index. The sampled signal s[n, c] may be monaural (one channel), stereo (two channels), or 5.1 surround (6 channels). When the sampled signal contains more than one channel, a downmix weighting d[c] may be used to produce a monaural signal:

$$s[n]=\Sigma_c d[c]s[n,c]$$

Exemplary parameters are provided for a sampling rate of 48 KHz.

The complex filter bank 600 generates the filter outputs 605 using a set of complex bandpass finite impulse response filters $h_k[n]$ where k is the band index. A Hanning window function with an exemplary length of 449 samples may be used to generate these filters. An exemplary value for the lowest pass band edge frequency is 427.62 Hz with subsequent band edges spaced by 534.52 Hz. The number of bands has an exemplary value of 32.

A complex filter output $x_k[n]$ is produced by filtering the monaural signal with the complex bandpass FIR filters:

$$x_k[n]=\Sigma_m h_k[m]s[n-m].$$

The weighted correlation and energy module 610 computes a weighted complex correlation for lag 1 with an exemplary value of 192:

$$q_k[n] = \sum_m x_k[m]v[n+m]x_k^*[m-l]$$

where the weighting function v[n] has an exemplary value consisting of a length L Hamming window where L has an exemplary value of 1920. For the modulator weighting function $w_k[n]$ employed by the modulator, improved performance was measured in typical use cases for a tapered demodulator weighting function v[n] in comparison to a rectangular weighting function due to higher weighting of higher SNR samples of the correlation.

Complex filters are advantageous in allowing significant computation reduction through downsampling without loss of performance even with the application of the nonlinear correlation operation.

The weight generator 625 computes a weighted energy:

$$e_k[n] = \sum_m |v[n+m]||x_k[m]|^2$$

The mapper 620 determines the soft demodulated bits $\tilde{d}_k[n]$ as $$\tilde{d}_k[n] = \frac{\Re(q_k[n])}{e_k[n] + e_k[n-l]}$$

Where $\Re()$ denotes the real part of a complex value.

For the case of differential modulation, soft demodulated bits $\tilde{d}_k[n]$ corresponding to a differential symbol may be computed as $$\tilde{d}_k[n] = \frac{\Re(q_k[n] - q_k[n-\delta])}{e_k[n] + e_k[n-l] + e_k[n-\delta] + e_k[n-l-\delta]}$$

where δ is the time separation between symbols encoded differentially.

It is often advantageous to compute weights $\gamma_k[n]$ for the soft demodulated bits $\tilde{d}_k[n]$ to improve the error correction performance of the channel decoder. For example, higher bit error rates are expected in regions of low amplitude due to lower signal-to-noise ratios in these regions. Weights which depend on energy such as $$\gamma_k[n]=\sqrt{e_k[n]+e_k[n-l]}.$$

may be used to improve performance in these regions. In addition, error statistics for bits modulated at particular frequencies may be estimated and used to modify the weights so that frequencies with lower estimated bit error rates have higher weights than frequencies with higher estimated bit error rates. Error statistics as a function of audio signal characteristics may also be estimated and used to modify the weights. For example, the modulator may be used to estimate the demodulation error for a particular segment of the audio signal and frequency and the weights may be decreased when the estimated demodulation error is large.

A desired property of audio watermarks is robustness when coded with a low bit rate audio coder. Audio coders typically use a perceptual model of the human auditory system to minimize perceived coding distortion. The perceptual model often determines a masking level based on the time/frequency energy distribution. An exemplary system uses a similar perceptual model to estimate a masking level. The weights $\gamma_k[n]$ are then set to the magnitude to mask ratio at each modulation frequency and time.

Figure 7:
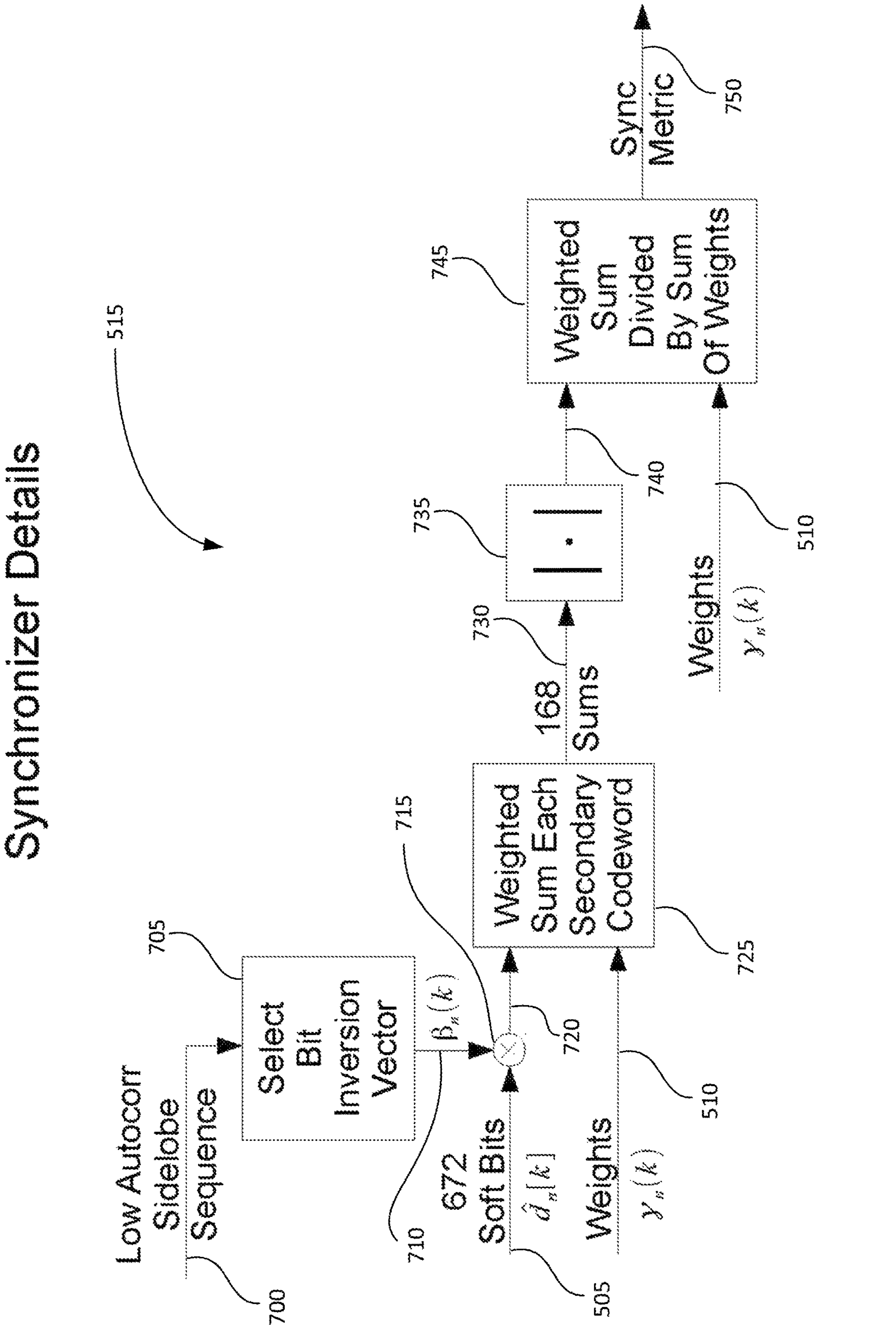
FIG. 7 is a block diagram of a synchronizer.

A secondary encoder controlled by a low autocorrelation sidelobe sequence may add redundancy which may be exploited for synchronization in addition to improved error detection and correction capability Referring to FIG. 7, the synchronizer 515 receives the soft bits 505 and the weights 510, and may also receive a low correlation sidelobe sequence 700 which may control the output of a secondary encoder. When a secondary encoder is employed, a bit inversion vector generator 705 generates a bit inversion vector $\beta_n(k)$ 710 that is combined with the soft bits 505 by a combiner 715, with the result 720 being provided, along with the weights 510, to a summer 725 that produces sums 730 corresponding to the soft bits and the weights. When no secondary encoder is employed, the summer 725 produces the sums 730 using the soft bits 505 and the weights 510. Magnitude operation 735 produces the magnitudes 740 using the sums 730. The summer 745 produces the sync metric 750 using the magnitudes 740 and weights 510. For example, the summer 745 may use the weights 510 to produce a weighted sum of the magnitudes 740, and then may divide that weighted sum by a sum of the weights 510 to produce the sync metric 750.

The modulator may reserve some symbol intervals for synchronization or other data. During such synchronization intervals, the modulator inserts a sequence of synchronization bits that are known by both the modulator and demodulator. These synchronization bits reduce the number of symbol intervals available to convey information, but facilitate synchronization at the receiver. For example, the modulator may reserve certain frequency bands and symbol intervals, and modulate a known bit pattern into these reserved regions. In this case, the demodulator synchronizes itself with the data stream by searching for the known synchronization bits within the reserved regions. Once the demodulator finds one or more instances of the synchronization pattern (making some allowances for bit errors), the demodulator can further improve synchronization reliability by performing channel decoding on one or more packets and using an estimate of the number of bit errors in the decoded packets or some other measure of channel quality as a measure of synchronization reliability. If the estimated number of bit errors is less than a threshold value, synchronization is established. Otherwise, the demodulator continues to check for synchronization.

In systems where no symbols are reserved for synchronization, the demodulator may use channel coding to synchronize itself with the data stream. In this case, channel decoding is performed at each possible offset and an estimate of channel quality is made vs offset. The offset with the best channel quality is compared against a threshold and, if that best channel quality exceeds a preset threshold, the demodulator uses the corresponding offset to synchronize itself with the data stream.

When a secondary encoder is used as described above, the redundancy present in the secondary encoder codewords may be used to aid synchronization. An exemplary system uses 168 bits of interleaved channel data which may be grouped into 21 symbols with 8 bits per symbol. Each of these bits may be encoded with a 4-bit code word to produce 672 bits with further error protection. Synchronization proceeds by selecting a starting sample for the packet and computing the soft demodulated bits $\tilde{d}_n$ [k] and weights $\gamma_n(k)$ as described above.

The metric $$\psi[n_s] = \frac{\sum_{n}\sum_{l=0}^{B-1}\left|\sum_{k=0}^{R-1}\gamma_n[kB+l]\tilde{d}_n[kB+l]\beta_n[k]\right|}{\sum_{n}\sum_{l=0}^{B-1}\left|\sum_{k=0}^{R-1}\gamma_n[kB+l]\right|}$$

may be computed where $n_s$ is the selected start sample, R is the number of bits in the secondary encoder codewords with an exemplary value of 4, and B is the number of bits per symbol (or modulation time) with unused interdependence in order to reduce synchronization complexity. An exemplary system sums n over the number of symbols in the packet (which, as noted above, is 21 in the described exemplary system). The bit inversion vector $\beta_n(k)$ is derived from the secondary encoder codewords used for transmitting a 0 by converting ones in the codeword to minus ones in the bit inversion vector and zeros in the codeword to ones in the bit inversion vector. So, for example, a codeword [0011] would produce the bit inversion vector [1, 1, −1, −1] and the codeword [0110] would produces the bit inversion vector [1, −1, −1, 1].

As noted above, one method of synchronization involves evaluating the metric $\psi[n_s]$ as a function of the start sample $n_s$ and choosing the packet start candidates as the N start samples which produce the largest metric values over a particular time interval. Due to the bandlimited nature of this metric, it may be sampled at lower rates than the original audio signal without significant loss of performance. Exemplary values of these parameters are 96 for the downsampling factor, 7 symbol intervals for the time interval, and 5 for the value of N. The packet start candidates determined in this manner may be evaluated by computing a packet detection metric for each candidate. When the packet detection metric is above a detection threshold and the CRC is valid, a payload detection may be declared.

The detection threshold may be used to provide a tradeoff between false detections (detecting a watermark packet when none exists, or detecting a packet with incorrect payload data) and missed detections (not detecting a packet where it was modulated). One method of determining the detection threshold is to create a database and measure the false detection rate relative to the detection threshold. The detection threshold may then be set to achieve a desired false detection rate.

Figure 8:
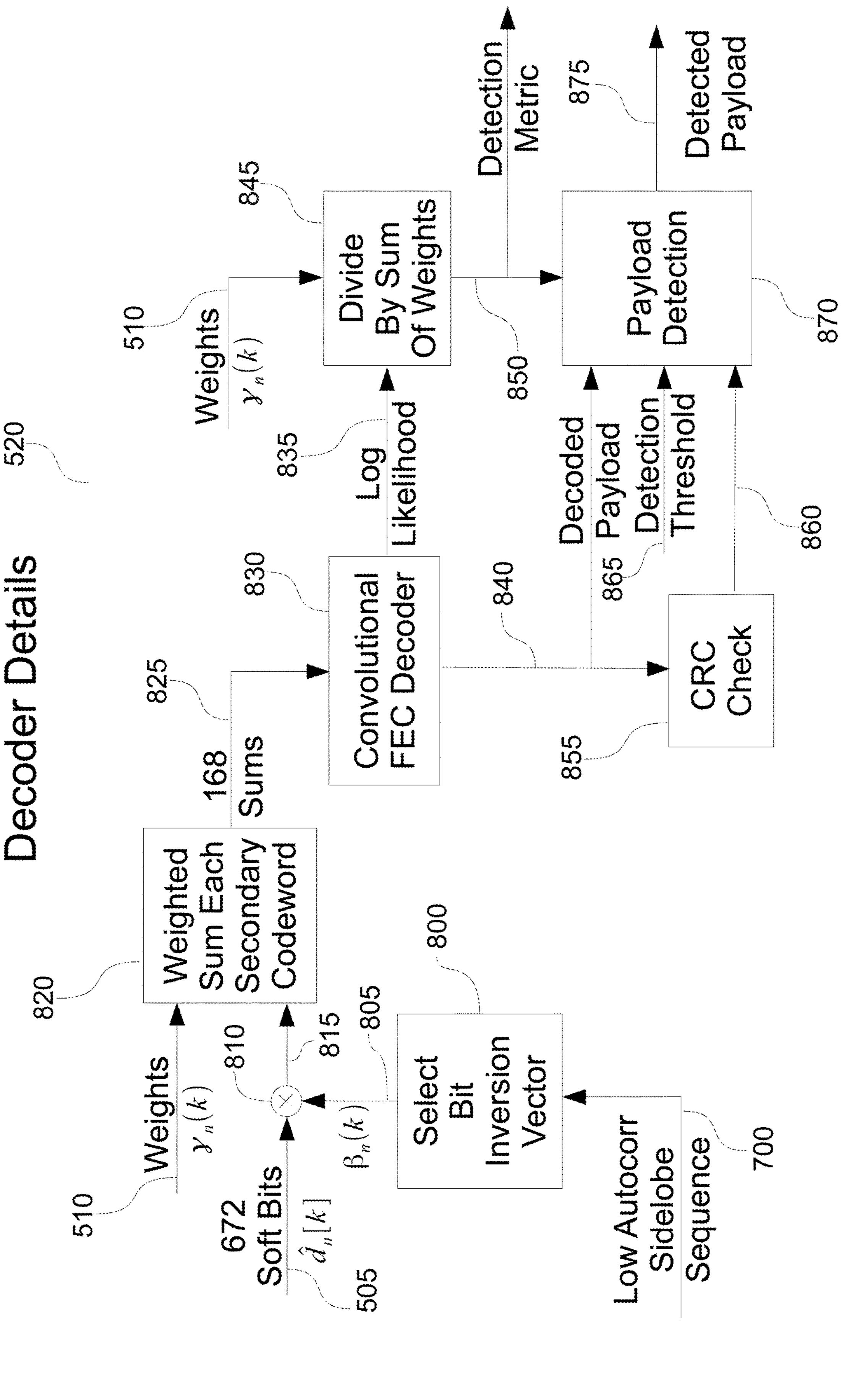
FIG. 8 is a block diagram of a decoder.

Referring to FIG. 8, the decoder 520 receives the soft bits 505 and the weights 510, and may also receive a low correlation sidelobe sequence 700 which may control the output of a secondary encoder. When a secondary encoder is employed, a bit inversion vector generator 800 generates a bit inversion vector $\beta_n(k)$ 805 that is combined with the soft bits 505 by a combiner 810 to produce modified soft bits 815 that are provided, along with the weights 510, to a summer 820 that produces sums 825 corresponding to the modified soft bits and the weights. When no secondary encoder is employed, the summer 820 produces the sums 825 using the soft bits 505 and the weights 510.

Convolutional FEC Decoder 830 produces decoded payloads 840 and log likelihoods 835 for the decoded payloads using the sums 825. Normalizer 845 produces detection metric 850 using weights 510 and log likelihoods 835. For example, the normalizer may divide the log likelihoods 835 by a sum of the weights 510.

CRC check 855 validates the CRC of decoded payload 840 to produce CRC check result 860. Payload detection unit 870 produces detected payload 875 using the decoded payload 840, the detection metric 850, the CRC check result 860, and the detection threshold 865.

In summary, in the receiver, the demodulator 500 computes soft bits 505 ($\tilde{d}_n$ [k] with values in the interval [−1, 1]) and weights 510 ($\gamma_n(k)$) from the received audio signal as described previously. When error correction coding is applied by the encoder, these values are fed to a corresponding error correction decoder to decode the source bits. In an exemplary system, soft bits and weights are computed from the complex filter outputs at 21 different symbol times, and the soft bits and weights are combined using a weighted sum over the frequency bands occupied by each secondary encoder codeword. For each symbol in the packet, the low autocorrelation sidelobe sequence value associated with that symbol is used to select a set of secondary encoder codewords. The codeword for transmitting a 0 is used to determine which soft decision bits should be inverted before the weighted sum is performed. So, for example, when a 0 is encountered in the low autocorrelation sidelobe sequence, the first two bits for a codeword are summed and the last two bits are multiplied by −1 before summation. When a 1 is encountered in the low autocorrelation sidelobe sequence, the first and last bits for a codeword are summed and the middle two bits are multiplied by −1 before summation.

The result is 168 combined soft bits and combined weights that are input to a Viterbi decoder that outputs 50 decoded source bits and 6 decoder CRC bits. In addition, the Viterbi decoder may output a packet reliability measure that can be used in combination with the decoded CRC bits to determine if the decoded source bits are valid (i.e., information bits are present in the audio signal) or invalid (i.e., no information bits are present in the audio signal). Typically, if the packet reliability measure is too low or if the decoded CRC does not match with that computed from the decoded source bits, then the packet is determined to be invalid. Otherwise, the packet is determined to be valid. For valid packets, the 50 decoded source bits are the output of the decoder.

Many variations are possible, including different numbers of bits, different forms of error correction or error detection coding, different secondary codewords and different methods of computing soft bits and weights.

The modulator typically modulates a packet of encoded payload data at a known time offset from a previously modulated packet of encoded payload data. This allows the start sample of subsequent packets to be predicted once a packet start sample is determined using a synchronization method.

The predicted start sample may be evaluated by computing a packet detection metric. When the packet detection metric is above an In Sync detection threshold and the CRC is valid, a payload detection may be declared and In Sync mode is maintained. Otherwise, if the detection metric is not above an In Sync detection threshold, or the CRC is invalid, the mode is changed to synchronization.

In addition, portions of the payload of the current packet may be predicted from previous packets. If the predicted portion of the payload is different from the decoded payload, this difference may be used to trigger a mode change to synchronization. If the predicted portion of the payload is the same as the decoded payload, the detection threshold may be lowered to reduce the probability of a missed detection while maintaining a low false alarm rate.

When the mode is changed from In Sync to synchronization, it is possible that a different audio channel was presented to the watermark detector with different packet start times. For this case, it may be desirable to preserve a buffer of audio samples so that synchronization may proceed immediately after the last detected packet. This reduces the probability of missed detections near the mode change.

A number of implementations have been described. Nevertheless, it will be understood that various modifications may be made. For example, useful results still may be achieved if aspects of the disclosed techniques are performed in a different order and/or if components in the disclosed systems are combined in a different manner and/or replaced or supplemented by other components. Accordingly, other implementations are within the scope of the following claims.

What is claimed is:

1. A method of conveying information using an audio channel, the method comprising modulating an audio signal to produce a modulated signal by embedding additional information into the audio signal, wherein modulating the audio signal comprises:

processing the audio signal to produce a set of filter responses;

creating a delayed version of the filter responses;

segmenting the delayed filter responses using a window function to produce windowed delayed filter responses;

modifying an amplitude of at least a first windowed delayed filter response with respect to an amplitude of at least a second windowed delayed filter response based on the additional information to produce a third windowed delayed filter response;

modifying a magnitude of at least the third windowed delayed filter response to produce a fourth windowed delayed filter response to control a level of distortion in the modulated signal relative to the audio signal;

combining at least the fourth windowed delayed filter response and a fifth windowed delayed filter response corresponding to echo amplitudes to produce an echo audio signal; and combining the audio signal and the echo audio signal to produce the modulated signal.

2. The method of claim 1, wherein the additional information comprises payload data.

3. The method of claim 2, wherein the additional information comprises watermark data produced by adding error detection and correction bits to the payload data.

4. The method of claim 1, wherein the additional information is formed by modifying encoded information by:

generating a low autocorrelation sidelobe sequence;

selecting a set of codewords based on the value of the low autocorrelation sidelobe sequence; and further encoding the encoded information using the selected set of codewords to produce the additional information.

5. The method of claim 1, wherein modifying the magnitude of at least the third windowed delayed filter response comprises employing a psychoacoustic model to estimate a perceived distortion in the modulated signal for a particular magnitude of at least the third windowed delayed filter response and reducing the magnitude until a desired target distortion is obtained.

6. The method of claim 1, wherein the first windowed delayed filter response is near in time and frequency to the second windowed delayed filter response.

* * * * *